(12) United States Patent
Comito, II

(10) Patent No.: US 11,630,524 B1
(45) Date of Patent: Apr. 18, 2023

(54) WIRELESS INPUT OUTPUT APPARATUS

(71) Applicant: Majestic Devices, Mclean, VA (US)

(72) Inventor: Gregory A Comito, II, Mclean, VA (US)

(73) Assignee: Majestic Devices, McLean, VA (US)

(*) Notice: Subject to any disclaimer, the term of this patent is extended or adjusted under 35 U.S.C. 154(b) by 0 days.

(21) Appl. No.: 17/546,355

(22) Filed: Dec. 9, 2021

(51) Int. Cl.
*G06F 3/023* (2006.01)

(52) U.S. Cl.
CPC .......... *G06F 3/0231* (2013.01); *G06F 3/0236* (2013.01); *G06F 3/0238* (2013.01)

(58) Field of Classification Search
CPC ..... G06F 3/0231; G06F 3/0236; G06F 3/0238
See application file for complete search history.

(56) References Cited

U.S. PATENT DOCUMENTS

| | | | | |
|---|---|---|---|---|
| 11,112,944 B1* | 9/2021 | Simon | ................... | G06F 3/0489 |
| 2013/0321468 A1* | 12/2013 | Nocera | ................... | G09G 5/14 |
| | | | | 345/651 |
| 2016/0133403 A1* | 5/2016 | Müller | ................... | H01H 13/14 |
| | | | | 200/345 |
| 2020/0402416 A1* | 12/2020 | Seale | ................... | G09B 13/00 |
| 2021/0048967 A1* | 2/2021 | Bernstein | ................ | G06F 3/016 |

* cited by examiner

*Primary Examiner* — Nelson M Rosario
*Assistant Examiner* — Scott D Au
(74) *Attorney, Agent, or Firm* — Jason C. Cameron

(57) ABSTRACT

A wireless input output apparatus is disclosed. The wireless input output apparatus includes a first housing mechanically coupled to the wireless input output apparatus panel. The first housing is configured to house a plurality of input keys. Each of the plurality of input keys corresponds to one of a character, a letter, a number, a function, and a command. The wireless input output apparatus also includes a second housing mechanically coupled adjacent to the first housing and over the wireless input output apparatus panel. The second housing is configured to house a capacitive touch screen display for rendering visual information. The wireless input output apparatus may be tethered to computer, phone, laptop, tablet, and the like without interrupting workflow when receiving calls, texts, "DMs", emails and the like.

10 Claims, 4 Drawing Sheets

US 11,630,524 B1

WIRELESS INPUT OUTPUT APPARATUS

FIELD OF INVENTION

Embodiments of the present disclosure relates to an input output device, and more particularly to a wireless input output apparatus.

BACKGROUND

Input output apparatus are configured for use with personal computers, such as desktop computers, that generally include a display unit and a main unit which contains all of the essential circuitry of the computer, such as the central processing unit, the power supply and data storage devices (e.g., floppy and hard disk). Personal computers support a variety of applications, some of which require extensive keyboard interaction while others merely require alphanumeric input. Computer users typically choose the type of input output apparatus required.

The personal computer input output apparatus commonly used in the English-speaking area, consists of five rows of character keys, and at the centre of the bottom row, there is a large space key which have several times width of a general character key. Conventional computer keyboards are challenging as the keyboards are generally deficient in providing users with the optimization of time, speed, and convenience.

Conventional computer keyboards are usually fixed with a particular computing device. A common keyboard cannot be used with every computing device. Furthermore, the keyboard physical keys are fixed in layout. Customization of the keyboard keys are not possible in the conventional design.

Hence, there is a need for a wireless input output apparatus and a method to operate the same and therefore address the aforementioned issues.

BRIEF DESCRIPTION

In accordance with one embodiment of the disclosure, a wireless input output apparatus is disclosed. The wireless input output apparatus includes a first housing mechanically coupled to the wireless input output apparatus panel. The first housing is configured to house a plurality of input keys. Each of the plurality of input keys corresponds to one of a character, a letter, a number, a function, and a command.

The wireless input output apparatus also includes a second housing mechanically coupled adjacent to the first housing and over the wireless input output apparatus panel. The second housing is configured to house a capacitive touch screen display for rendering visual information. The wireless input output apparatus also includes a hardware processor. The wireless input output apparatus also includes a memory coupled to the hardware processor. The memory comprises a set of program instructions in the form of a plurality of subsystems and configured to be executed by the hardware processor.

The plurality of subsystems also includes a device connecting subsystem. The device connecting subsystem is configured to connect to one or more computing devices via a communication interface. The profile customizing subsystem is configured to cast screen from the connected one or more computing devices for visual interaction. The profile customizing subsystem is also configured to customizes video and image as screen saver for the connected one or more computing devices. The profile customizing subsystem is also configured to enable real time customization of each of the plurality of input keys and the capacitive touch screen display for an interactive computing function. The profile customizing subsystem is also configured to enable a user to interact with the connected one or more computing devices via inputs from each of the plurality of input keys and the capacitive touch screen display.

In accordance with one embodiment of the disclosure, a method for operating wireless input output apparatus is disclosed. The method includes connecting the wireless input output apparatus to one or more computing devices via a communication interface. The method also includes casting screen from the connected one or more computing devices for visual interaction. The method also includes customizing video and image as screen saver for the connected one or more computing devices. The method also includes enabling real time customization of each of the plurality of input keys and the capacitive touch screen display for an interactive computing function. The method also includes enabling a user to interact with the connected one or more computing devices via inputs from each of the plurality of input keys and the capacitive touch screen display.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
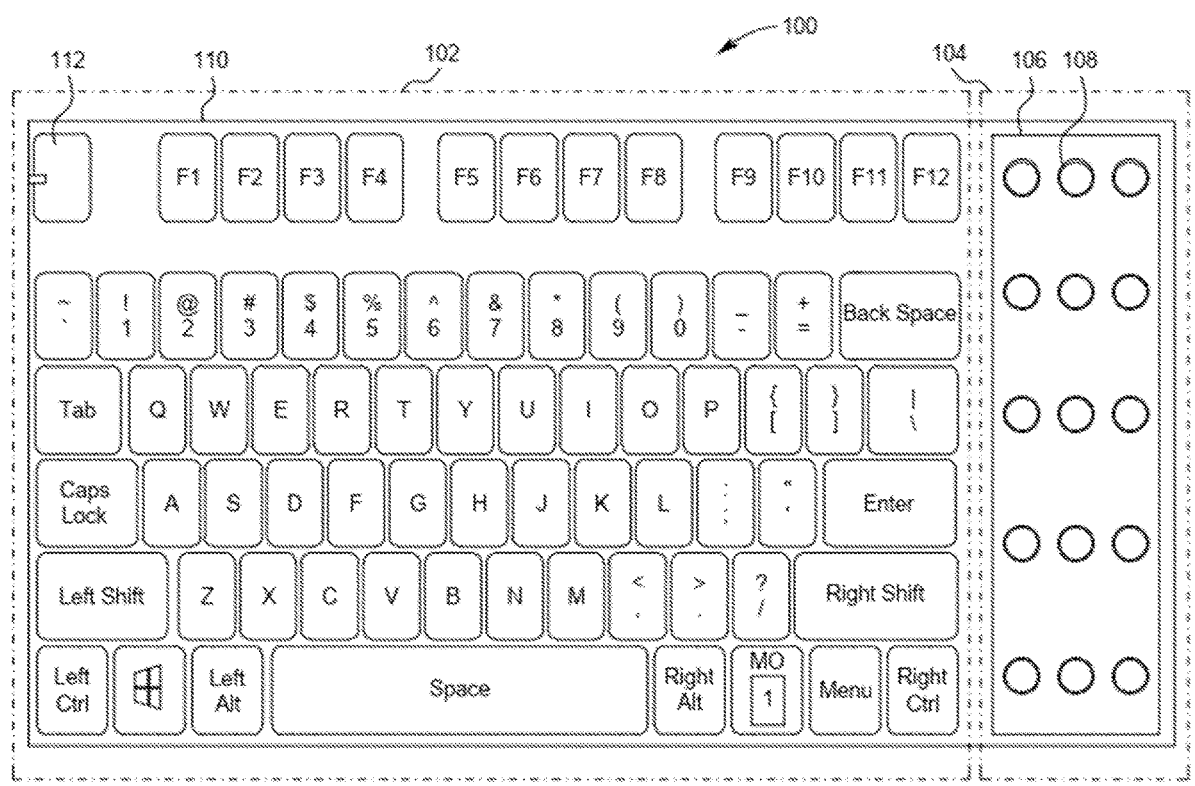
FIG. 1 is a schematic representation illustrating a wireless input output apparatus in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings:the singular forms "a", "an", and "the" include plural references unless the context clearly dictates otherwise.

A computer system (standalone, client or server computer system) configured by an application may constitute a "subsystem" that is configured and operated to perform certain operations. In one embodiment, the "subsystem" may be implemented mechanically or electronically, so a subsystem may comprise dedicated circuitry or logic that is permanently configured (within a special-purpose processor) to perform certain operations. In another embodiment, a "subsystem" may also comprise programmable logic or circuitry (as encompassed within a general-purpose processor or other programmable processor) that is temporarily configured by software to perform certain operations.

Accordingly, the term "subsystem" should be understood to encompass a tangible entity, be that an entity that is physically constructed permanently configured (hardwired) or temporarily configured (programmed) to operate in a certain manner and/or to perform certain operations described herein.

FIG. 1 is a schematic representation illustrating a wireless input output apparatus 100 in accordance with an embodiment of the present disclosure. A user connects an input device to a computer to send information into one or more computing devices and an output device is connected to collect information from the one or more computing devices. In one such embodiment, the one or more computing devices includes a desktop, a laptop, a mobile device, a smart device, and the like. In another such embodiment, the wireless input output apparatus 100 may include a keyboard apparatus.

The wireless input output apparatus 100 includes a first housing 102. The first housing 102 is mechanically coupled to the wireless input output apparatus 100 panel. In such embodiment, the first housing 102 is fabricated in rectangular shape of pre-defined dimensions. The wireless input output apparatus 100 panel is an aluminium or plastic frame 110 configured to act as a base for the input output apparatus 100. In one embodiment, the wireless input output apparatus 100 panel is fabricated with woven fiberglass cloth and an epoxy resin binder or FR-4 material.

The first housing 102 is configured to house a plurality of input keys. Each of the plurality of input keys corresponds to one of a character, a letter, a number, a function, and a command. Each of the plurality of input keys is arranged in a plurality of rows of continuous keys (as shown in FIG. 1).

Each of the plurality of input keys is fabricated with removable "MX-style" switches 112 with removable plastic keycaps. In one embodiment, the plurality of input keys is constructed with hot-swappable feature for customization. In such embodiment, a kit of hot-swappable sockets is added to the wireless input output apparatus 100 Printed Circuit Board (PCB) circuit. The socket hot-swappable kit allows the mechanical switches to be swapped directly and ready to use. "MX-style" switches 112 are all shaped like the Cherry MX switches, with small variations in slider design, spring weight, click mechanism, and the like.

The first housing 102 also includes a rechargeable battery. The rechargeable battery may be a lithium-ion battery. A rechargeable battery is a type of electrical battery that is comprised of one or more electrochemical cells. The first housing 102 also includes a charging port for charging the rechargeable battery. The charging port includes "USB type C" connector that will be capable of charging the "lithium ion battery" as well as "HDMI out/in" support, "Windows/Mac file debugging/recognition", and all other functions that accompany "USB type C, 3.1". The first housing 102 further includes light strip source fabricated along each of the plurality of input keys. In one embodiment, a Red Green Blue (RGB) light strip is positioned below each of the plurality of input keys. The Red Green Blue (RGB) light strip helps in lighting and decorating the wireless input output apparatus 100.

The first housing 102 further includes a custom hybrid Keyboard Printed Circuit Board (PCB) that entangles the wireless input output apparatus hardware, a hardware processor and the rechargeable battery. Specifically, the custom hybrid keyboard PCB entangles the keyboard hardware, processors, battery, and technological features to one PCB and/or combing multiples PCBs to make a whole system. In one specific embodiment, the first housing 102 also includes universal serial bus port (USB-C 3.2) of type C connector for transferring and sharing data with the connected one or more computing devices. The first housing 102 also houses a microphone to enable audio interaction with the connected one or more computing devices. The first housing also includes "3.5 mm audio port" and a microphone for "Virtual Assistant" support.

The wireless input output apparatus 100 also includes a second housing 104. The second housing 104 is mechanically coupled adjacent to the first housing 102 and over the wireless input output apparatus 100 panel. The second housing 104 is configured to house a capacitive touch screen display 108 for rendering visual information. The capacitive touch screen display 108 is a control display that uses the conductive touch of a human finger or a specialized device for input. In such embodiment, the capacitive touch screen display 108 is fabricated with "gorilla glass".

The capacitive touch screen display 108 is operable to render information communicated to the wireless input output apparatus via a one or more connecting interfaces. The capacitive touch screen display renders visual information, the visual information includes information comprising Graphics Interchange Format (GIF) display, Portable document format display and images. Furthermore, the second housing 104 further include multi-core android capable processor 106. In such embodiment, the android capable processor 106 is support with google support. The android capable processor 106 also helps the wireless input output apparatus to connect with the one or more computing devices via the one or more connecting interfaces.

Figure 2:
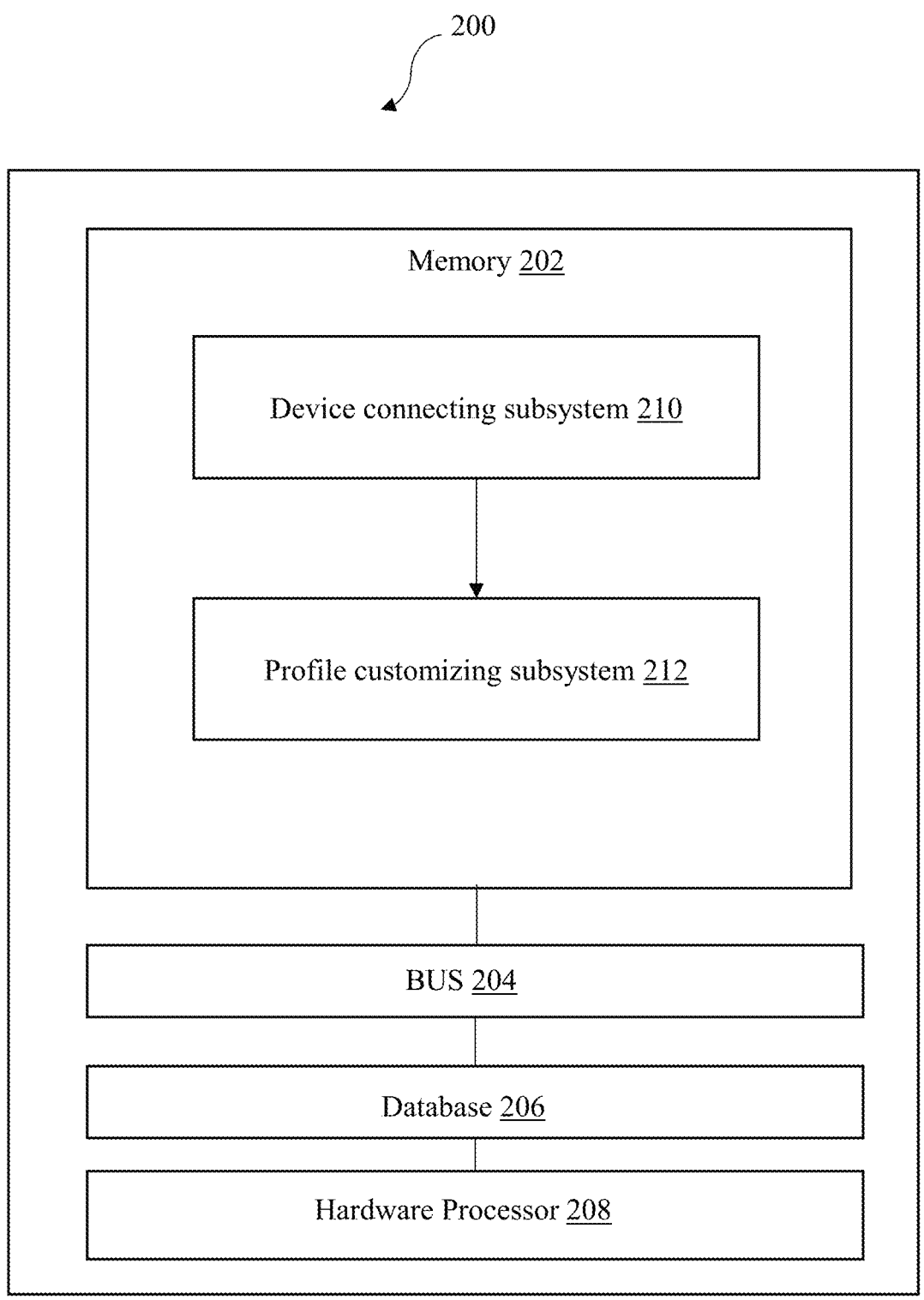
FIG. 2 is a block diagram illustrating operation system of the wireless input output apparatus in accordance with an embodiment of the present disclosure.

FIG. 2 is a block diagram illustrating operation process of the wireless input output apparatus 200 in accordance with an embodiment of the present disclosure. The wireless input output apparatus 100 also includes a hardware processor 208. The wireless input output apparatus 100 also includes a memory 202 coupled to the hardware processor 208. The memory 202 comprises a set of program instructions in the form of a plurality of subsystems and configured to be executed by the hardware processor 208.

The hardware processor 208, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 202 includes a plurality of subsystems stored in the form of executable program which instructs the hardware processor 208 via bus 204 to perform the method steps. The plurality of subsystems has following subsystems: a device connecting subsystem 210 and a profile customizing subsystem 212.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the hardware processor 208.

The plurality of subsystems also includes a device connecting subsystem 210. The device connecting subsystem 210 is configured to connect to one or more computing devices via a one or more connecting interfaces. The one or more connecting interfaces includes Bluetooth 5.2, WI-FI 6E, WI-FI 6, WI-FI 5, and the like. The WI-FI capabilities may be for example, 2.5 gz and 5 ghz. The one or more computing devices may be IOS/Android/MacOS/Windows devices which are connecting to the internet, and allowing for updates.

The plurality of subsystems also includes a profile customizing subsystem 212. The profile customizing subsystem 212 is configured to cast screen from the connected one or more computing devices for visual interaction. A screencast is a digital video recording of a computing device screen and usually includes audio narration.

The profile customizing subsystem 212 is also configured to customize video and image as screen saver for the connected one or more computing devices. In such embodiment, the profile customizing subsystem 212 also allows the connected one or more computing device data to synchronize with the wireless input output apparatus 100.

The profile customizing subsystem 212 is also configured to enable real time customization of each of the plurality of input keys and the capacitive touch screen display for an interactive computing function. The profile customizing subsystem 212 allows inclusion of entities other than "number pad application" or "macro pad application". In such embodiment, key inputs of each of the plurality of input keys may be customized.

The profile customizing subsystem 212 is also configured to enable a user to interact with the connected one or more computing devices via inputs from each of the plurality of input keys and the capacitive touch screen display. Such interaction enables functioning of the wireless input output apparatus 100.

The profile customizing subsystem 212 comprises four applications: Numberpad Application, Macopad application, Device synchronizing application and Screen Saver Application. The profile customizing subsystem 212 comes with a multitude of proprietary software apart from Standard Android OS applications including but not limited to: the "Numberpad Application" that emulates a number pad on the touch screen display 108, a "Macopad Application" that allows the user to make a variety of different custom macros/inputs designated to GIF, PDF, or IMAGE files that is displayed on a grid of the touch screen display 108, a "Device Sync Application" that allows the user to receive all notifications from any connected devices to the apparatus 100 notification bar as well as "ScreenCasting" from these various devices, "Screen Saver Application" that allows the user to make custom videos as their screen saver while the computing device is in standby mode, and a "Keyboard Function Application" that allows the user to make various keyboard layouts as well as make custom key inputs that activate applications/functions on the display/processor or the computing device it is being used on. The apparatus 100 features multiple versions with different screen sizes and panels in either aluminium or plastic at differing price points.

Figure 3:
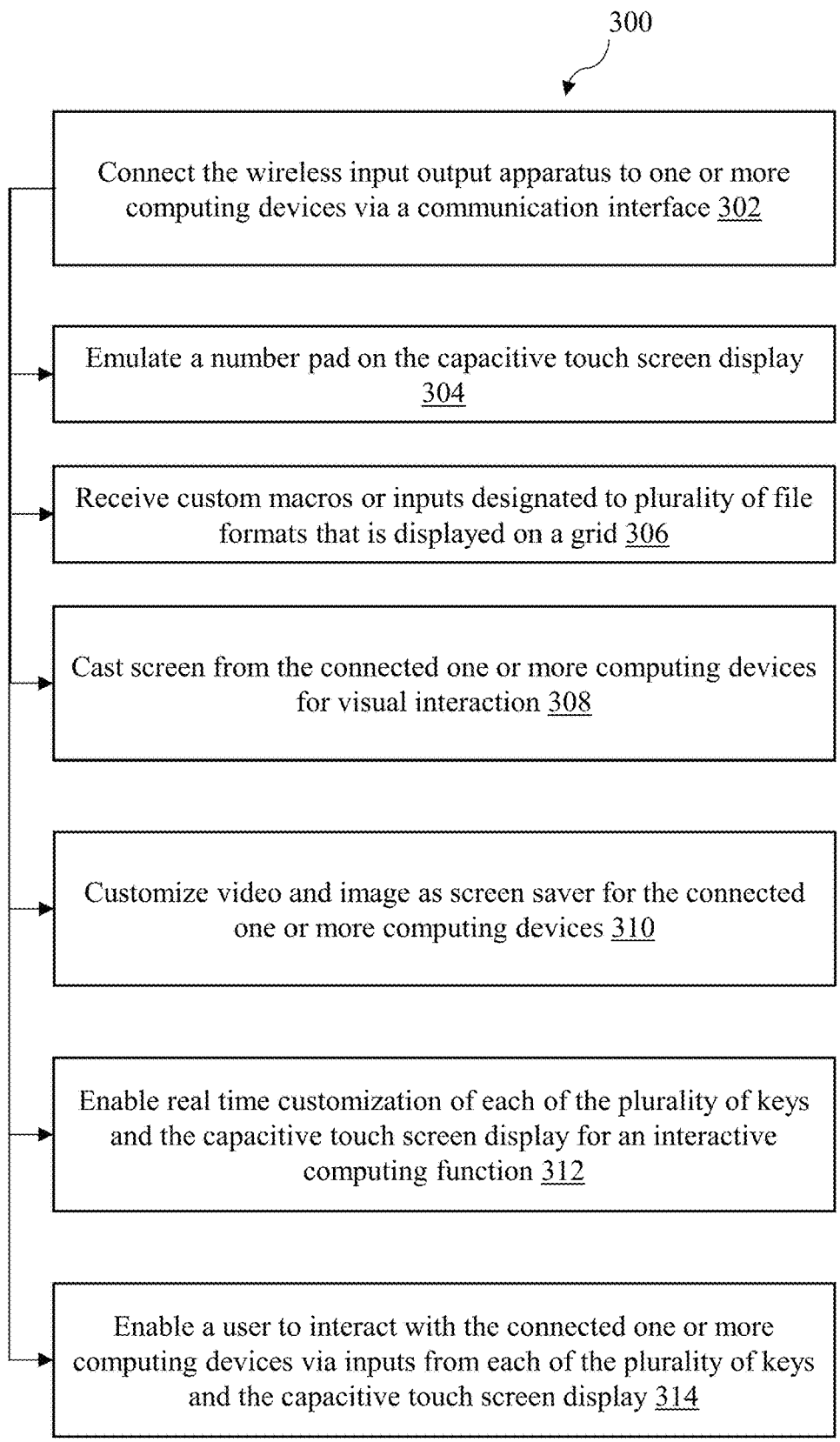
FIG. 3 is a process flowchart illustrating an exemplary method for operating the wireless input output apparatus in accordance with an embodiment of the present disclosure.

FIG. 3 is a process flowchart illustrating an exemplary method 300 for operating the wireless input output apparatus in accordance with an embodiment of the present disclosure. In step 302, the wireless input output apparatus 100 is connected one or more computing devices is via a communication interface. In one aspect of the present embodiment, the wireless input output apparatus 100 is connected by a device connecting subsystem 210.

In step 304, a number pad on the capacitive touch screen display is emulated.

In step 306, custom macros or inputs designated to plurality of file formats is received and is displayed on a grid.

In step 308, screen from the connected one or more computing devices is casted for visual interaction. In one aspect of the present embodiment, screen from the connected one or more computing devices is casted for visual interaction by a profile customizing subsystem 212. The casting screen comprises receiving a plurality of notifications from the connected one or more computing devices to a notification bar.

In step 310, video and image are customized as screen saver for the connected one or more computing devices. In one aspect of the present embodiment, video and image are customized as screen saver by the profile customizing subsystem 212.

In step 312, real time customization of each of the plurality of input keys and the capacitive touch screen display is enabled for an interactive computing function and generate plurality of keyboard layouts. In one aspect of the present embodiment, the real time customization of each of the plurality of input keys and the capacitive touch screen display is enabled by the profile customizing subsystem 212.

In step 314, a user is enabled to interact with the connected one or more computing devices via inputs from each of the plurality of input keys and the capacitive touch screen display. In one aspect of the present embodiment, the user is enabled to interact with the connected one or more computing devices by the profile customizing subsystem 212.

Figure 4:
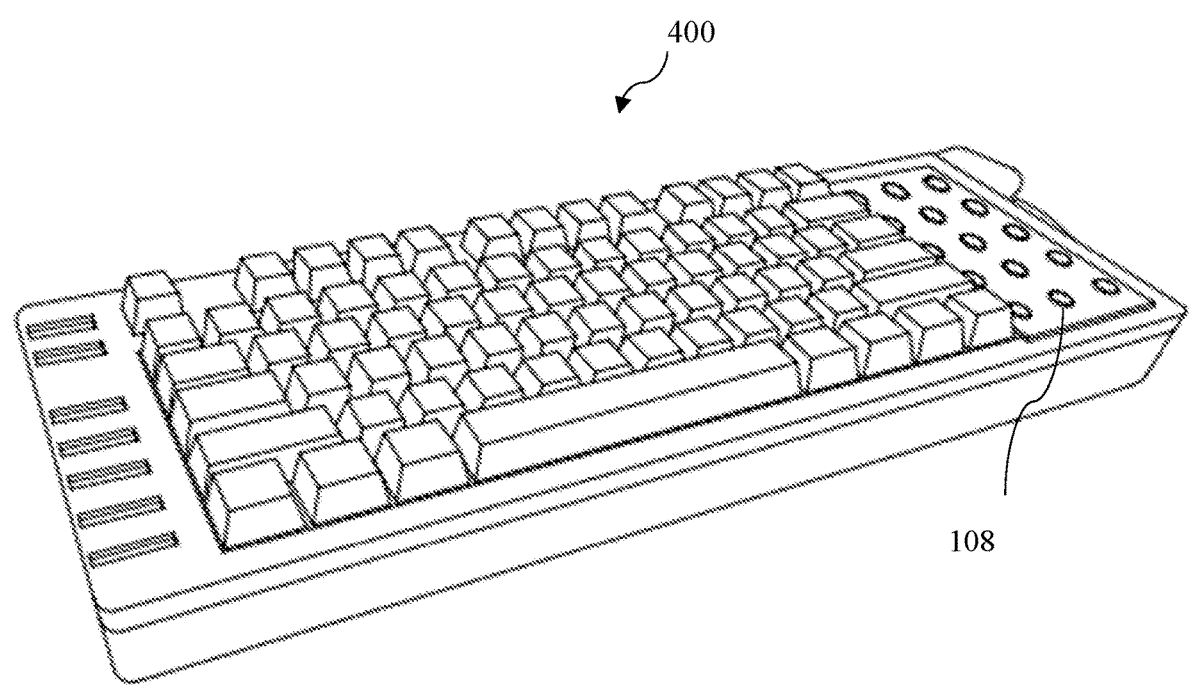
FIG. 4 is a pictorial representation of the wireless input output apparatus in accordance with an embodiment of the present disclosure.

FIG. 4 is a pictorial representation of the wireless input output apparatus 400 in accordance with an embodiment of the present disclosure.

Various embodiments of the present disclosure provide wireless input output apparatus 100 with one connection to each of the one or more computing devices. A user may access from one convenient spot with the ergonomic support of having a full mechanical keyboard to control it all. The wireless input output apparatus 100 may be tethered to computer, phone, laptop, tablet, and the like without interrupting the workflow when receiving calls, texts, "DMs", emails and the like. It is essentially the one connection to every device user has in one convenient spot with the ergonomic support of having a full mechanical keyboard to control it all. By having a high-powered android processor with various technologies around it, the wireless input output apparatus 100 creates a tether to user's computer, to user's phone, to user's laptop, to user's tablet, that can organize it into one device that is always at user fingertips, thereby never interrupting user's workflow when someone calls, texts, "DMs", "likes", or emails you while working, browsing, chatting, or gaming at user desktop. Additionally, since the wireless input output apparatus 100 can screen-mirror and act as a second screen to user's workstation, whether user are a hefty investor always keeping their eyes on the market, a working parent who needs to keep their eyes on their baby in the other room, or a streamer needing to see what their chat is doing while the game is taking up their monitors, that intuitive screen will be there to extend user's workflow/life without juggling multiple devices. On the go, this the wireless input output apparatus 100 is a standalone android computer capable of everything users basic computer or tablet can do with the absolute freedom and comfort of a mechanical keyboard. Users can access all the typical applications found in the "Google Playstore" without dealing with the chunkiness of a laptop (and worse, the keyboard on the laptop), making this the preferred tool when traveling or even for students going from class-to-class. This wireless input output apparatus 100, because of its various features, has truly an unlimited number of applications to connect to everything users need it to and because it is built into a tool.

Additionally, the wireless input output apparatus 100 may also screen-mirror and act as a second screen for workstation. The screen mirror feature helps a hefty investor to keep close watch on the market, a working parent to keep close watch on their baby in the other room or enables a streamer to chat is doing while playing game or multi-tasking in the computing device. The wireless input output apparatus is a standalone android computer capable of everything a basic computer can do with the absolute freedom and comfort of a mechanical keyboard. The user can access all of the typical applications found in the "Google Playstore" without dealing with the chunkiness of a laptop (and worse, the keyboard on the laptop). The wireless input output apparatus 100 may easily be used by students and travelers.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

I claim:

1. A wireless input output apparatus, comprising:
   a first housing mechanically coupled to a wireless input output apparatus panel and configured to house a plurality of input keys, wherein each of the plurality of input keys corresponds to one of a character, a letter, a number, a function, and a command, wherein each of the plurality of input keys is arranged in a plurality of rows of continuous keys;
   a second housing mechanically coupled adjacent to the first housing and over the wireless input output apparatus panel, wherein the second housing is configured to house a capacitive touch screen display for rendering visual information;
   a hardware processor;
   a memory coupled to the hardware processor, wherein the memory comprises a set of program instructions in the form of a plurality of subsystems, configured to be executed by the hardware processor, wherein the plurality of subsystems comprises:
   a device connecting subsystem configured to connect to one or more computing devices via a communication interface; and
   a profile customizing subsystem configured to:
   emulate a number pad on the capacitive touch screen display;
   receive custom macros or inputs designated to plurality of file formats that is displayed on a grid of the capacitive touch screen display;
   cast screen from the connected one or more computing devices for visual interaction, wherein the casting screen comprises receiving a plurality of notifications from the connected one or more computing devices to a notification bar;
   customize video and image as screen saver for the connected one or more computing devices;
   enable real time customization of each of the plurality of input keys and the capacitive touch screen display for an interactive computing function and generate plurality of keyboard layouts; and
   enable a user to interact with the connected one or more computing devices via inputs from each of the plurality of input keys and the capacitive touch screen display; and
   a custom hybrid Keyboard Printed Circuit Board (PCB) which entangles a wireless input output apparatus hardware, the hardware processor, and a rechargeable battery.

2. The wireless input output apparatus of claim 1, wherein each of the plurality of input keys is fabricated with removable "MX-style" switches with removable plastic keycaps.

3. The wireless input output apparatus of claim 1, wherein the first housing comprises a charging port for charging the rechargeable battery.

4. The wireless input output apparatus of claim 1, further comprises light strip source fabricated along each of the plurality of input keys.

5. The wireless input output apparatus of claim 1, further comprises a universal serial bus (USB) port for transferring and sharing data with the connected one or more computing devices.

6. The wireless input output apparatus of claim 1, further comprises a microphone to enable voice interaction with the connected one or more computing devices.

7. The wireless input output apparatus as claimed in claim 1, wherein the capacitive touch screen display is operable to render information communicated to the wireless input output apparatus via one or more connecting interfaces.

8. The wireless input output apparatus as claimed in claim 1, wherein the one or more connecting interfaces comprises Bluetooth 5.2, WI-FI 6E, WI-FI 6 and WI-FI 5.

9. The wireless input output apparatus as claimed in claim 1, wherein the capacitive touch screen display renders visual information comprising Graphics Interchange Format (GIF) display, Portable document format display and images.

10. A method for operating wireless input output apparatus, comprising:
   connecting, by a hardware processor, a wireless input output apparatus to one or more computing devices via a communication interface, wherein the wireless input output apparatus comprises a custom hybrid Keyboard Printed Circuit Board (PCB) that entangles a wireless input output apparatus hardware, the hardware processor, and a rechargeable battery;
   emulating, by the hardware processor, a number pad on a capacitive touch screen display of the wireless input output apparatus;
   receiving, by the hardware processor, custom macros or inputs designated to plurality of file formats that is displayed on a grid of the capacitive touch screen display;
   casting, by the hardware processor, screen from the connected one or more computing devices for visual interaction, wherein the casting screen comprises receiving a plurality of notifications from the connected one or more computing devices to a notification bar;

customizing, by the hardware processor, video and image as screen saver for the connected one or more computing devices;

enabling, by the hardware processor, real time customization of each of the plurality of input keys and the capacitive touch screen display for an interactive computing function and generate plurality of keyboard layouts; and enabling, by the hardware processor, a user to interact with the connected one or more computing devices via inputs from each of the plurality of input keys and the capacitive touch screen display.

\* \* \* \* \*